United States Patent
Chiku et al.

(10) Patent No.: US 8,026,335 B2
(45) Date of Patent: Sep. 27, 2011

(54) BAKED RESIN PRODUCT AND ELECTRONIC DEVICE COMPRISING THE SAME

(75) Inventors: Yoshinori Chiku, Tsukuba (JP); Yuji Eguchi, Tsukuba (JP); Kazuo Doyama, Tsukuba (JP)

(73) Assignee: Sekisui Chemical Co., Ltd., Osaka (JP)

(*) Notice: Subject to any disclaimer, the term of this patent is extended or adjusted under 35 U.S.C. 154(b) by 45 days.

(21) Appl. No.: 12/299,245

(22) PCT Filed: May 1, 2007

(86) PCT No.: PCT/JP2007/059308
§ 371 (c)(1),
(2), (4) Date: Oct. 31, 2008

(87) PCT Pub. No.: WO2007/129640
PCT Pub. Date: Nov. 15, 2007

(65) Prior Publication Data
US 2009/0318658 A1    Dec. 24, 2009

(30) Foreign Application Priority Data

May 1, 2006   (JP) .................. 2006-127378
Dec. 25, 2006 (JP) .................. 2006-348163

(51) Int. Cl.
*C08G 65/10* (2006.01)
(52) U.S. Cl. ............. 528/94; 528/153; 528/403; 544/94
(58) Field of Classification Search .................. 528/94, 528/153, 403
See application file for complete search history.

(56) References Cited

U.S. PATENT DOCUMENTS

2009/0054614 A1 *  2/2009  Eguchi et al. ............... 528/162

FOREIGN PATENT DOCUMENTS

| JP | 09-059334 A | 3/1997 |
|----|-------------|--------|
| JP | 09-176263 A | 7/1997 |
| JP | 2003-064180 A | 3/2003 |
| JP | 2003-82099 A | 3/2003 |
| JP | 2003-292728 A | 10/2003 |
| JP | 2004-10839 A | 1/2004 |
| JP | 2004-103495 A | 4/2004 |

OTHER PUBLICATIONS

Yu et al. (Polymer 43, 3163-3168, 2002).*
Kano, et al., "Preparation of Symmetric Polybenzoxazine Precursors and the Polymers Therefrom," Polymer Preprints, 2005, p. 1818, vol. 54, No. 1. English Abstract.
Iio, et al., "Preparation of Asymmetric Polybenzoxazine Precursors and the Polymers Therefrom," Polymer Preprints, 2005, p. 1819, vol. 54, No. 1. English Abstract.

* cited by examiner

*Primary Examiner* — Randy Gulakowski
*Assistant Examiner* — Shane Fang
(74) *Attorney, Agent, or Firm* — Sughrue Mion, PLLC (57) ABSTRACT

The present invention provides a baked resin product that exhibits an excellent heat resistance and an electronic device that incorporates this baked resin product. The present invention provides a baked resin product obtained by baking a resin composition that contains a main chain-type aromatic benzoxazine structure, wherein the baked resin product has a peak measured by $^{13}$C-NMR at 58±2 ppm and a half width of this peak of 4 to 10 ppm. The present invention also provides a method of producing a baked resin product, comprising baking a resin composition that contains a main chain-type aromatic benzoxazine structure at 270° C. to 350° C. The present invention further provides an electronic device that incorporates this baked resin product.

26 Claims, 6 Drawing Sheets

BAKED RESIN PRODUCT AND ELECTRONIC DEVICE COMPRISING THE SAME

TECHNICAL FIELD

The present invention relates to a baked resin product that exhibits an excellent heat resistance and more particularly relates to a highly heat-resistant baked resin product that is obtained by baking a resin composition that contains a main chain-type aromatic benzoxazine structure.

BACKGROUND ART

Various resin compositions that exhibit an excellent heat resistance and excellent electrical properties have been developed and proposed as electronic devices and components that employ such resin compositions. For example, Patent Document 1 and Non-patent Documents 1 and 2 provide baked resin products, for example, films, obtained by baking a resin composition such as the film of a benzoxazine structure-containing precursor.

Patent Document 1 discloses the structure of a main chain-type aromatic benzoxazine constituted from bisphenol, an aromatic diamine, and formaldehyde; a resin composition comprising a BisA-BAPP-derived main chain-type aromatic benzoxazine; and the fact that the baking temperature for baking this composition is 180° C.

Non-patent Document 1 also discloses films obtained by heating each of the following to 240° C.: a precursor film comprising a main chain-type aromatic benzoxazine originating from methanedianiline (MDA), and a precursor film comprising a main chain-type aliphatic benzoxazine originating from hexamethylenediamine (HDA).

In addition, Non-patent Document 2 describes the governing temperature for the ring-opening polymerization of main chain-type benzoxazine and teaches that benzoxazine undergoes a complete ring-opening polymerization when curing is carried out by ring opening of the oxazine ring at the exothermic peak temperature from the exothermic peak in the DSC chart.

However, while the existing baked resin products do have fairly good electrical properties, at present their heat resistance has yet to reach acceptable levels. Moreover, there is also desire for improvements in the properties of electronic devices and components that employ baked resin products as insulating materials.

Patent document 1: Japanese Patent Application Laid-open No. 2003-64180
Non-patent document 1: Takuya KANO, Tarek AGAG, and Tsutomu TAKEICHI, Synthesis and Ring-opening Polymerization of Symmetric High Molecular Weight Polybenzoxazine Precursors, *Polymer Preprints, Japan, Volume* 54, No. 1 (2005), p. 1818.
Non-patent document 2: Kazuya IIO, Tarek AGAG, and Tsutomu TAKEICHI, Synthesis and Ring-opening Polymerization of Asymmetric High Molecular Weight Polybenzoxazine Precursors, *Polymer Preprints*, Japan, Volume 54, No. 1 (2005), pp. 1818-1819.

An object of the present invention is therefore to provide a baked resin product that exhibits an excellent heat resistance.

An other object of the present invention is to provide an electronic device that incorporates this baked resin product.

DISCLOSURE OF THE INVENTION

Means for Solving the Problems

As a result of extensive investigations, the present inventors have for the first time discovered that the coefficient of linear thermal expansion CTE is reduced and the 5% thermal decomposition weight loss temperature Td5 is raised when a specific peak is present in $^{13}$C-NMR measurements on a baked resin product obtained by the baking of a resin composition that has a specific structure. The present inventors were thereby able to obtain knowledge that enabled the aforementioned objects to be accomplished.

The present invention is based on such knowledges. The present invention thus has the following structure.

1. A baked resin product obtained by baking a resin composition comprising a main chain-type aromatic benzoxazine structure, wherein the baked resin product has a peak measured by $^{13}$C-NMR at 58±2 ppm and a half width of this peak of 4 to 10 ppm.

2. The baked resin product according to item 1, wherein a coefficient of linear thermal expansion CTE determined by TMA is from 30 to 80 ppm/° C.

3. The baked resin product according to item 1, wherein a 5% weight loss temperature is at least 400° C.

4. The baked resin product according to any of items 1 to 3, wherein the main chain-type aromatic benzoxazine structure is formed of a thermosetting resin that is obtained by heating and reacting a) a multifunctional phenol compound represented by general formula (I) given below, b) a diamine compound represented by general formula (II) given below, and c) an aldehyde compound (wherein X represents an organic group that contains at least 3 carbons or an aromatic ring-containing organic group that contains at least 6 carbons, and may contain N, O, or F as heteroatoms, provided that the benzene rings on the two sides of X are bonded to the same atom in X or to different atoms in X)

(wherein Y represents an organic group that contains at least 5 carbons and may contain N, O, or F as heteroatoms, wherein the benzene rings on the two sides of Y are bonded to different atoms in Y).

5. The baked resin product according to item 4, wherein X is bonded mainly to para position with respect to a OH group on the benzene ring on both sides of X, and X has either or both of the structures given below or represents —C(CH$_3$)$_2$—:

6. The baked resin product according to item 4, wherein X has the structure given below:

(wherein n is an integer from 0 to 10).

7. The baked resin product according to item 4, wherein X has the structure given below:

(wherein n is an integer from 0 to 10).

8. The baked resin product according to any of items 4 to 7, wherein Y in the general formula (II) contains at least one benzene ring.

9. The baked resin product according to any of items 4 to 7, wherein Y in the general formula (II) is at least one group selected from the group of formulas given below and is bonded to meta position or para position with respect to the NH$_2$ group on the benzene ring on both sides of Y:

10. The baked resin product according to any of items 4 to 7, wherein Y in the general formula (II) contains at least two benzene rings.

11. The baked resin product according to any of items 4 to 7, wherein Y in the general formula (II) is at least one group selected from the group of formulas given below and is bonded to meta position or para position with respect to the NH$_2$ group on the benzene ring on both sides of Y:

-continued

12. The baked resin product according to any of items 4 to 11, wherein the main chain-type aromatic benzoxazine structure is formed of a thermosetting composition that contains at least the thermosetting resin.

13. The baked resin product according to item 12, wherein the thermosetting composition contains a compound that has at least one dihydrobenzoxazine structure within a molecule.

14. The baked resin product according to any of items 4 to 11, comprising a cured article obtained by curing the thermosetting resin or a thermosetting composition that contains at least the thermosetting resin, or comprising a molding obtained without curing or as necessary by partially curing the thermosetting resin, or comprising a cured molding obtained by curing such a molding.

15. The baked resin product according to any of items 1 to 14, wherein the baked resin product is a film.

16. A method of producing a baked resin product, comprising: baking a resin composition that contains a main chain-type aromatic benzoxazine structure at a temperature of 270° C. to 350° C.

17. A method of producing a baked resin product, comprising: baking a resin composition that contains a main chain-type aromatic benzoxazine structure at a temperature of at least 280° C. for at least 1 hour.

18. A method of producing a baked resin product, comprising: baking a resin composition that contains a main chain-type aromatic benzoxazine structure for a baking time of at least 16 hours at 240° C., at least 8 hours at 250° C., at least 4 hours at 260° C., at least 2 hours at 270° C., or at least 1 hour at 280° C.

19. An electronic device that incorporates the baked resin product according to any of items 1 to 15.

Advantageous Effects of the Invention

The present invention provides a highly heat-resistant baked resin product, a method of producing this resin composition, and an electronic device that incorporates this baked resin product.

BEST MODE FOR CARRYING OUT THE INVENTION

Figure 1:
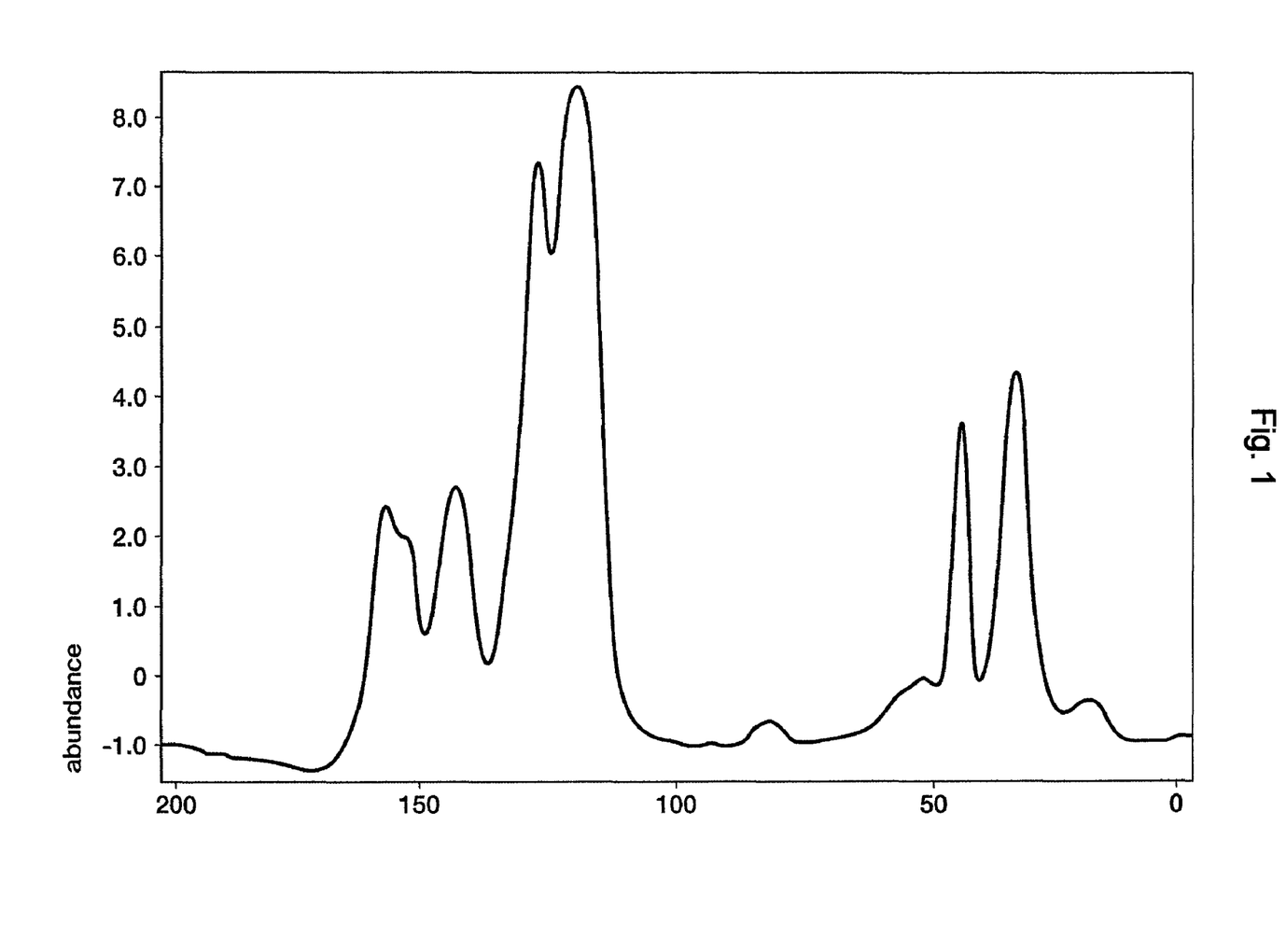
FIG. 1 shows the complete NMR chart (0 to 200 ppm) from Comparative Example 2.
Figure 2:
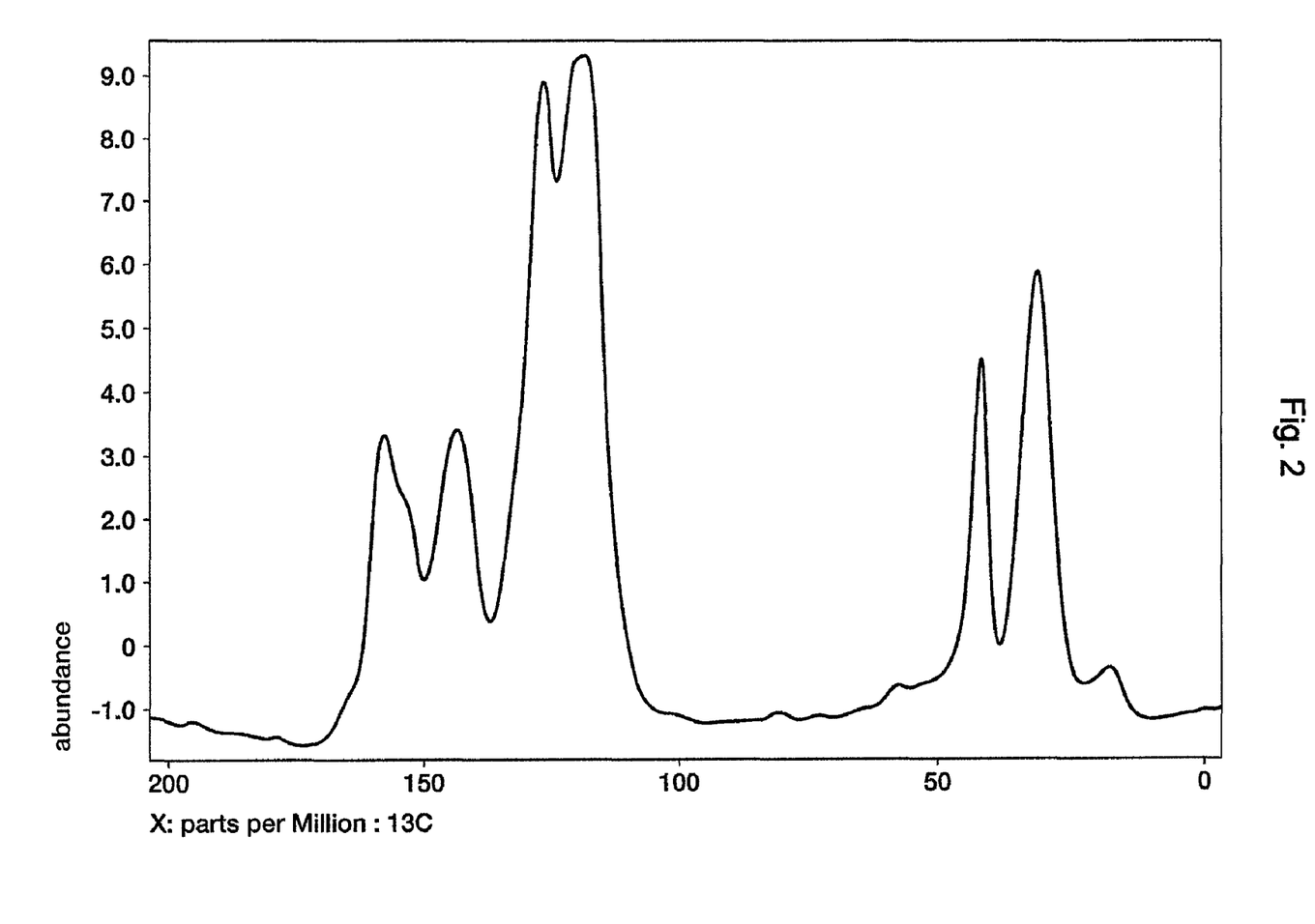
FIG. 2 shows the complete NMR chart (0 to 200 ppm) from Example 2.
Figure 3:
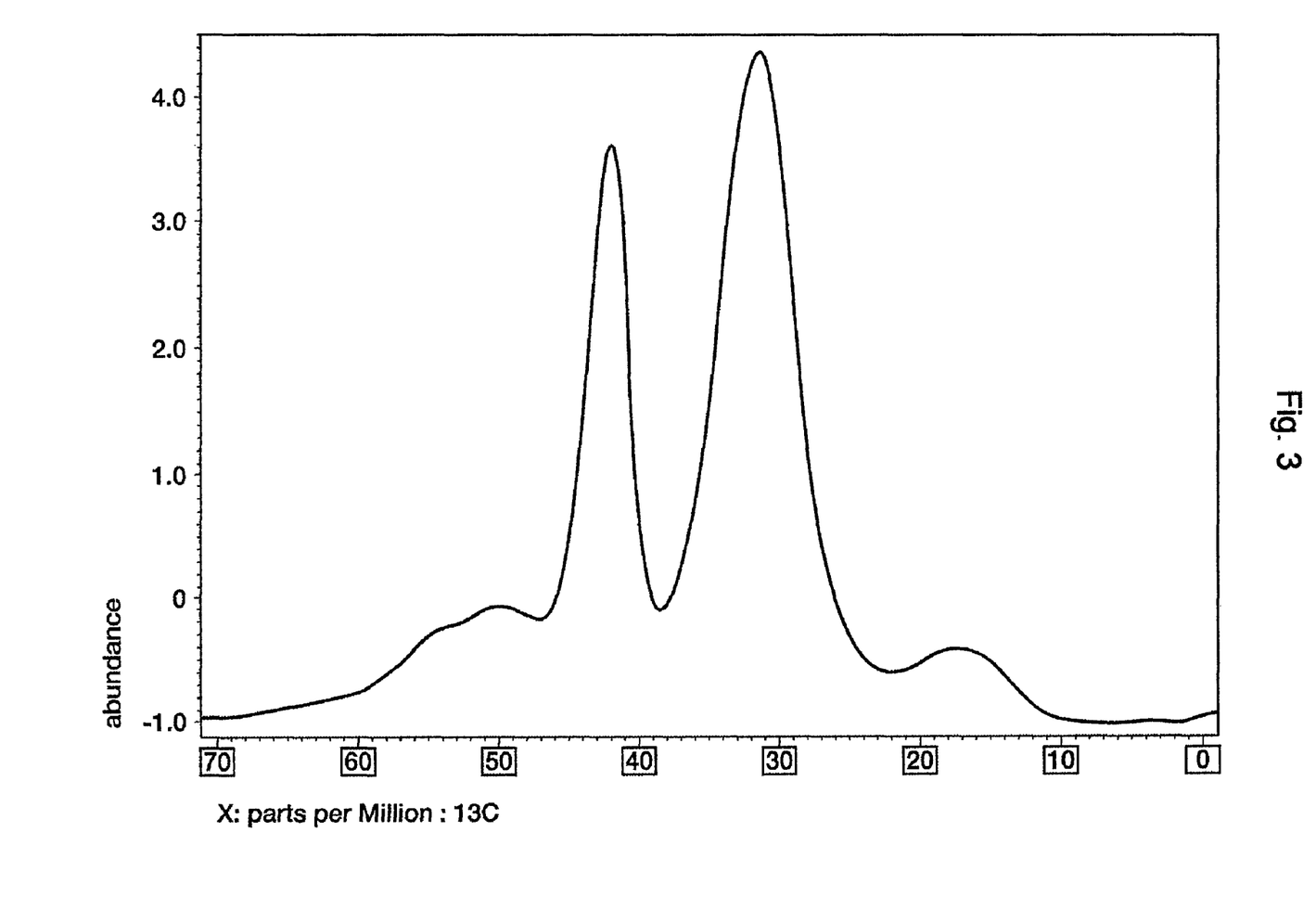
FIG. 3 shows an enlargement (0 to 70 ppm) of the NMR chart from Comparative Example 2.
Figure 4:
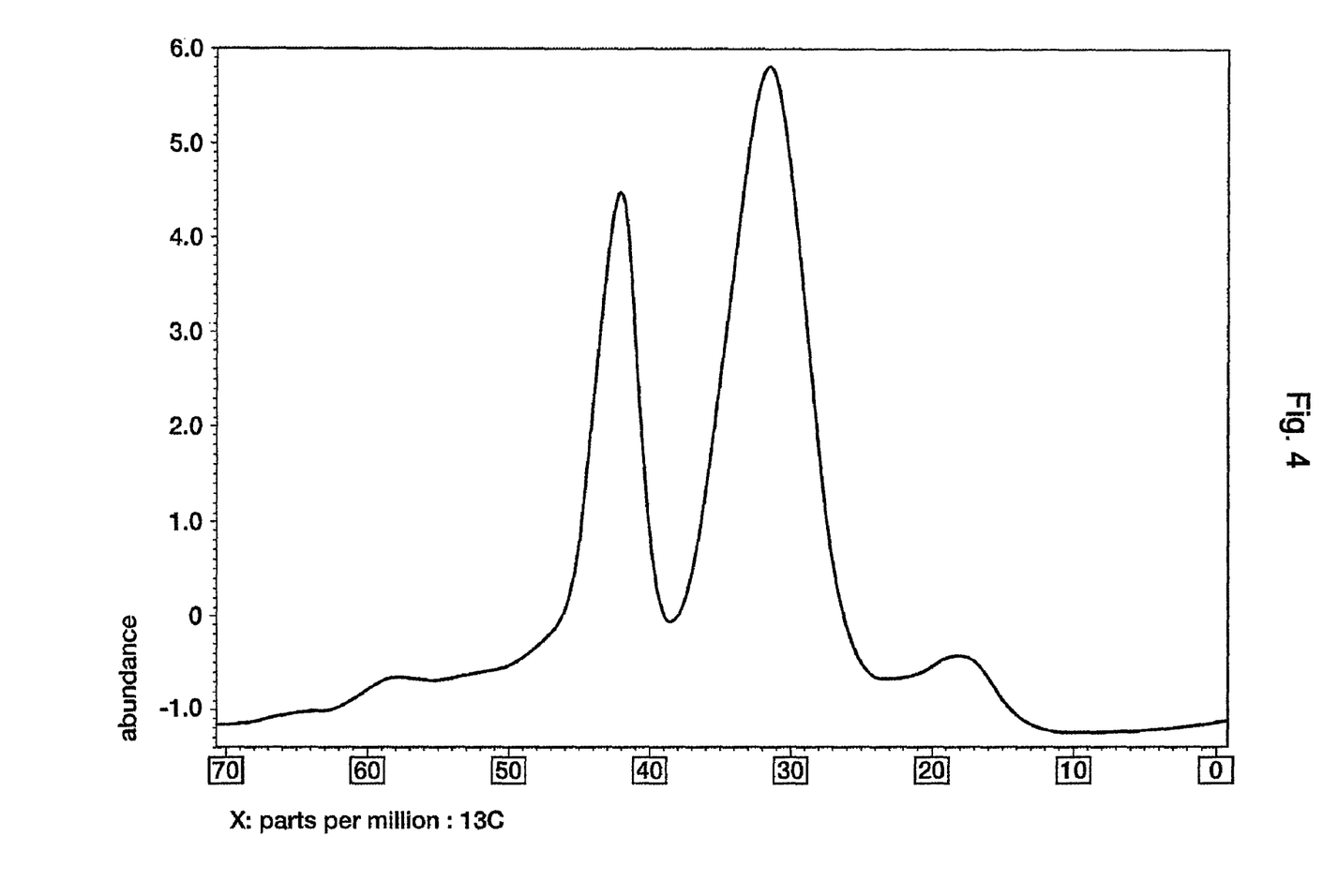
FIG. 4 shows an enlargement (0 to 70 ppm) of the NMR chart from Example 2.
Figure 5:
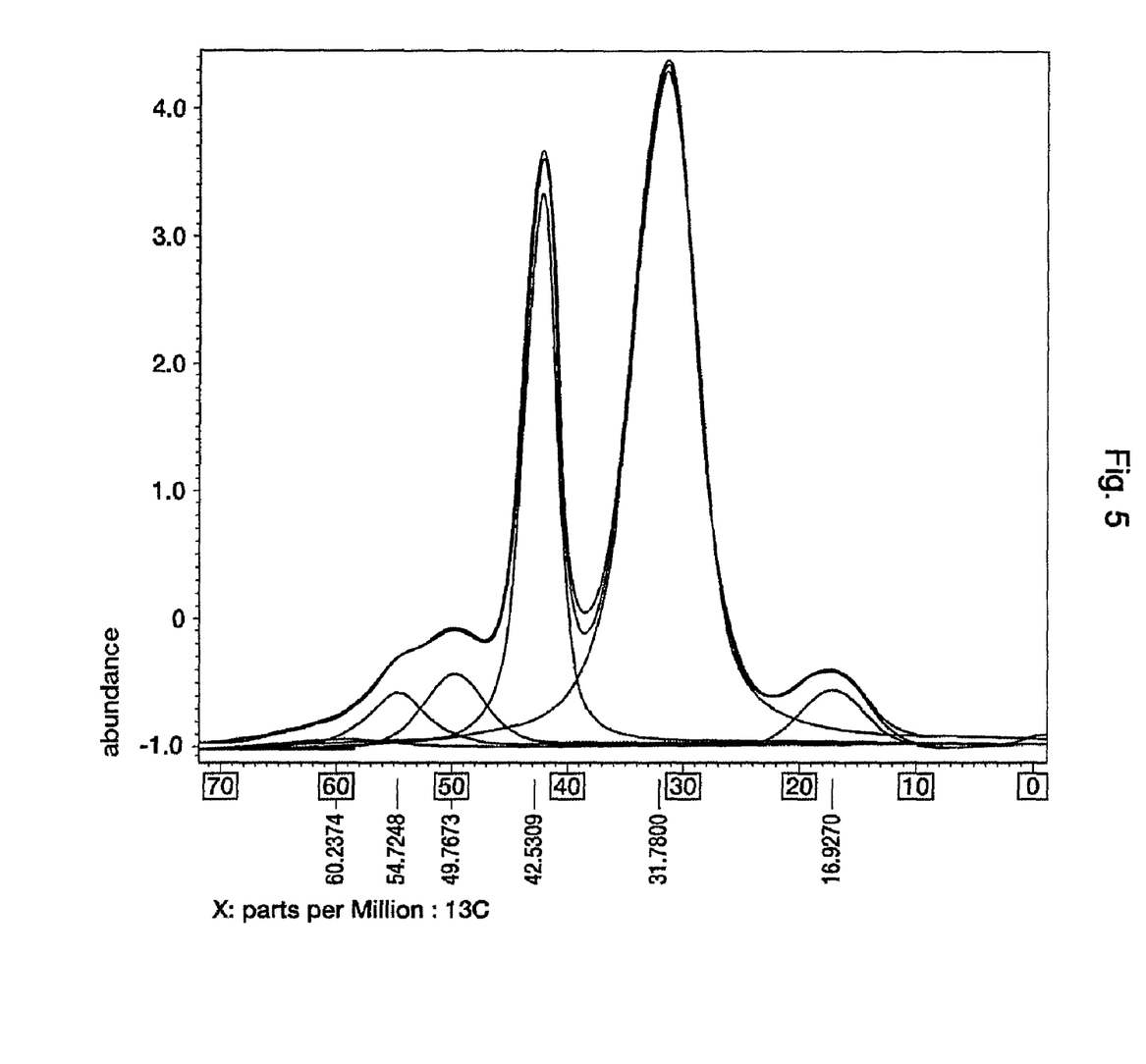
FIG. 5 is drawing that shows the absence of the peak at 58 ppm when the enlarged NMR chart from Comparative Example 2 is subjected to peak separation by curve fitting.
Figure 6:
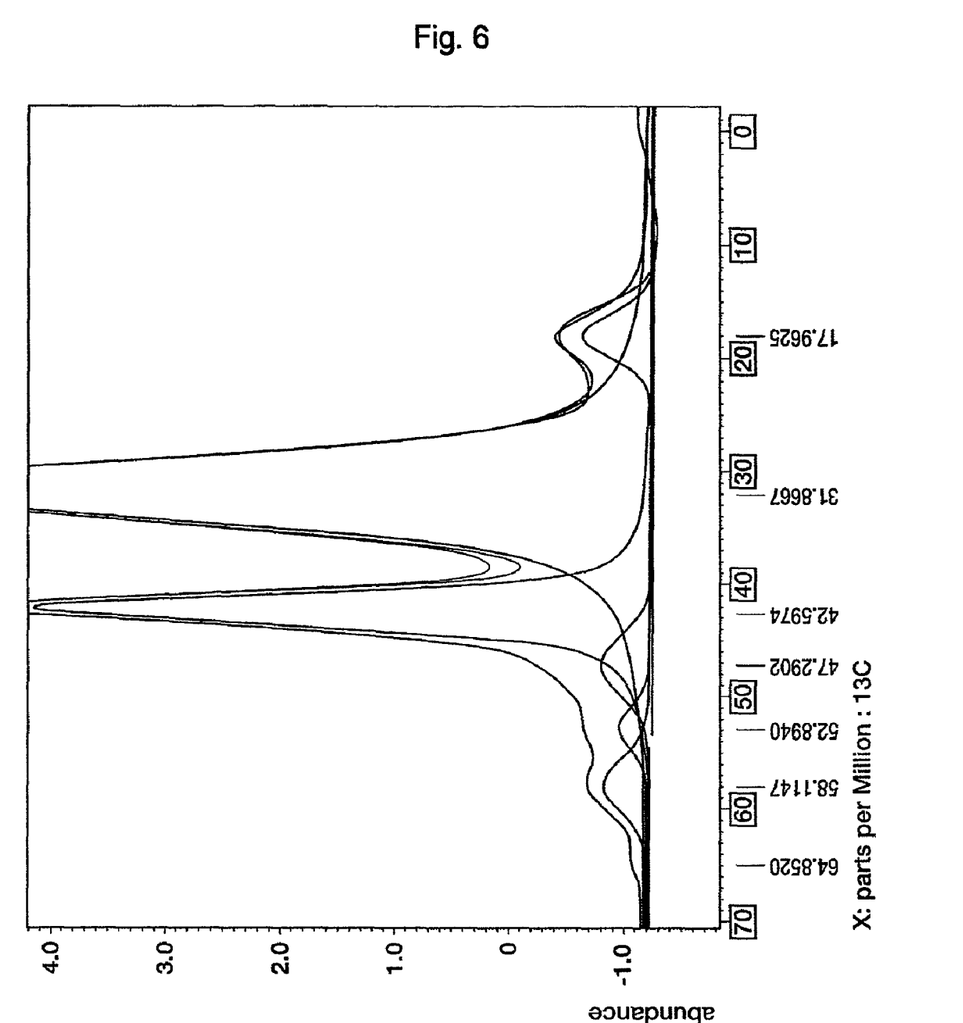
FIG. 6 is a drawing that shows the presence of the peak at 58 ppm when the enlarged NMR chart from Example 2 is subjected to peak separation by curve fitting.

The present invention is described in detail in the following based on preferred embodiments.

[The Baked Resin Product]

The baked resin product according to the present invention is obtained by baking a resin composition comprising a main chain-type aromatic benzoxazine structure and has a peak at 58±2 ppm and preferably 58±1 ppm when subjected to $^{13}$C-NMR measurement wherein the half width of this peak is from 4 to 10 ppm.

The term "peak" used herein refers to the shape obtained by carrying out waveform separation on the approximately normal distribution trace in the NMR chart by curve fitting and denotes the ppm at the highest point thereof. The term "peak half width" used herein refers to a width of the peak at the distance obtained by dividing the distance from the base line to the top of the peak by two and is displayed in ppm on the NMR chart.

The peak width is specified in order to discriminate between peak and noise.

Note that while the aforementioned peak is said to appear upon ring opening of the benzoxazine ring, the appearance of this peak is not disclosed in the existing literature even under conditions presumed to cause complete ring opening of the benzoxazine ring.

As stated above, the baked resin product according to the present invention has a peak at 58±2 ppm when measured by $^{13}$C-NMR.

The baked resin product according to the present invention has an excellent heat resistance because it comprises such a structure.

The resin composition that is the precursor for the baked resin product according to the present invention comprises, as stated above, a main chain-type aromatic benzoxazine structure. The term "main chain-type aromatic benzoxazine structure" used herein refers to a structure in which an aromatic group-containing benzoxazine ring makes up a portion of the main chain of the polymer in the resin composition that is the precursor for the baked article; in addition, an aromatic ring is directly bonded to the nitrogen that participates in the benzoxazine skeleton. The chemical structures provided below are preferred specific examples. The term "resin composition" used herein refers to thermosettable, that is, it has the ability to convert into a cured article when subjected to heat.

The term "baked resin product" in the present invention refers to a product in which a change in a chemical structure thereof is caused by the application of heat to the "resin composition".

A preferred embodiment of the baked resin product according to the present invention is the resin film obtained by baking, at from 270° C. to 350° C., a film comprising a thermosetting precursor that contains the main chain-type aromatic benzoxazine structure.

The lower temperature limit during baking of the resin composition is preferably at least 280° C. and more preferably at least 290° C.

On the other hand, based on thermal degradation considerations, the upper temperature limit during baking of the resin composition is preferably 330° C. or less and more preferably being 310° C. or less.

The resin composition containing the main chain-type aromatic benzoxazine structure is preferably baked at from 270° C. to 350° C. to obtain the baked resin product according to the present invention. The benzoxazine ring structure undergoes a thorough ring-opening polymerization when baking is carried out within such a temperature range.

The resin composition containing the main chain-type aromatic benzoxazine structure is preferably baked in the present invention for at least 1 hour at a temperature of at least 280° C. As above, the benzoxazine ring structure undergoes a thorough ring-opening polymerization when baking is carried out at such a temperature for such a time period.

In addition, the resin composition containing the main chain-type aromatic benzoxazine structure is preferably baked in the present invention for a baking time of at least 16 hours at 240° C., at least 8 hours at 250° C., at least 4 hours at 260° C., at least 2 hours at 270° C., or at least 1 hour at 280° C. As above, the benzoxazine ring structure undergoes a thorough ring-opening polymerization when baking is carried out at the indicated temperatures for the indicated time periods.

From the viewpoint of the thermal decomposition, the upper limit on the baking time is desirably 64 hours or less at 240° C., 32 hours or less at 250° C., 16 hours or less at 260° C., 8 hours or less at 270° C., and 4 hours or less at 280° C.

The relationship between temperature and time is based on Arrhenius' law (a 10° C. change in the temperature results in a twofold difference in the reaction time), which is well known to the individual skilled in the art. Based on this law, all conditions equivalent to the aforesaid temperature-time relationship are encompassed by the present invention.

The baked resin product according to the present invention generally has a CTE, as determined by TMA, of from 30 to 80 ppm/° C. Values within such a range can be expected in particular to prevent the peeling of the electroconductive material (particularly copper foil) from the resin that can be caused by the thermal stresses that arise during high-temperature conditions when soldering or soldering reflow due to the differences between the linear expansion rates of the resin and electroconductive material. The linear expansion rate is desirably made small enough to equal that of copper foil.

The 5% weight loss temperature of the baked resin product according to the present invention is generally at least 400° C. and preferably is from 400 to 450° C. Values within such a range can be expected to prevent the blistering between the resin and electroconductive material—particularly copper foil—that occurs due to volatiles produced by thermal decomposition of the resin during high-temperature conditions when soldering or soldering reflow.

Viewed from the perspective of achieving an excellent heat resistance, the main chain-type aromatic benzoxazine structure is preferably formed of a thermosetting resin that is obtained by heating and reacting a) multifunctional phenol compounds represented by general formula (I) given below, b) diamine compounds represented by general formula (II) given below, and c) aldehyde compounds (wherein X represents an organic group that contains at least 3 carbons or represents an aromatic ring-containing organic group that contains at least 6 carbons, and may contain N, O, and/or F as heteroatoms, provided that benzene rings on the two sides of X are bonded to the same atom in X or to a different atom in X)

(wherein Y represents an organic group that contains at least 5 carbons and may contain N, O, and/or F as heteroatoms, provided that benzene rings on the two sides of Y are bonded to different atoms in Y).

The multifunctional phenol compounds given by general formula (I) above is used as component (a) in the present invention. There are no particular limitations on such multifunctional phenol compounds as long as they are difunctional or higher functional multifunctional phenols.

X in general formula (I) for component a) multifunctional phenol compounds that are preferably used in the present invention represents an organic group that contains at least 3 carbons and preferably that contains 3 carbons, or represents an aromatic ring-containing organic group that contains at least 6 carbons and preferably at least 8 carbons and more preferably from 12 to 21 carbons. X may contain N, O, and/or F as heteroatoms.

Taking into consideration in particular such factors as the reactivity during synthesis of the thermosetting resin and the heat resistance, mechanical properties, and electrical properties of the cured article, X is preferably bonded mainly in para position with respect to the OH group on the benzene ring on both sides of X, and X preferably has either or both of the structures given below or is —C(CH$_3$)$_2$—.

Moreover, taking into consideration in particular such factors as the reactivity during synthesis of the thermosetting resin and the heat resistance, mechanical properties, and electrical properties of the cured article, X preferably has the structure given below (n in the formula is an integer from 0 to 10 and preferably from 0 to 5).

Taking into consideration in particular such factors as the reactivity during synthesis of the thermosetting resin and the heat resistance, mechanical properties, and electrical properties of the cured article, X preferably also has the structure given below

(n in the formula is an integer from 0 to 10 and preferably from 0 to 5).

Specific examples of such component a) multifunctional phenol compounds may include 4,4'-[1,4-phenylenebis(1-methylethylidene)]bisphenol (Bisphenol P from Mitsui Chemicals, Inc.), 4,4'-[1,3-phenylenebis(1-methylethylidene)]bisphenol (Bisphenol M from Mitsui Chemicals, Inc.), biphenyl novolac-type phenolic resin (MEH7851 from Meiwa Plastic Industries, Ltd.), and xylylene novolac-type phenolic resin (MEH7800 from Meiwa Plastic Industries, Ltd.). A single multifunctional phenol compound can be used or two or more multifunctional phenol compounds can be used.

Diamine compounds as given by general formula (II) above are preferably used as component b) in the present invention.

Long-chain aromatic diamine compounds are component b) diamine compounds preferably used by the present invention, wherein Y in the general formula (II) represents an organic group that contains at least 5 carbons, preferably from 5 to 20 carbons, and more preferably from 5 to 15 carbons. The electrical properties can be improved when Y contains N, O, and/or F as heteroatoms. The benzene rings on the two sides of Y are not bonded to the same atom in Y.

Taking into consideration in particular such factors as the solubility during synthesis of the thermosetting resin and the mechanical properties and electrical properties of the cured article, Y is preferably the following group:

Taking into consideration in particular such factors as the heat resistance, mechanical properties, and electrical properties of the cured article, Y preferably contains at least one benzene ring.

Specific examples of Y's that contain at least one benzene ring may include at least one group selected from the group of formulas given below, said group or groups being bonded in meta position or para position with respect to the $NH_2$ group on the benzene ring on both sides of Y. These groups are preferred for Y in particular because they yield an excellent heat resistance, mechanical properties, and electrical properties for the cured article.

Y preferably contains at least two benzene rings taking into consideration in particular such factors as the heat resistance, mechanical properties, and electrical properties of the cured article.

Specific examples of Y's that contain at least two benzene rings may include at least one group selected from the group of formulas given below, said group or groups being bonded in meta position or para position with respect to the $NH_2$ group on the benzene ring on both sides of Y. These groups are preferred for Y in particular because they yield an excellent heat resistance, mechanical properties, and electrical properties for the cured article.

The following are specific examples of such component b) diamine compounds: 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,3-bis(4-aminophenoxy)neopentane, 2,2-bis[4-(3-aminophenoxy)phenyl]propane, 2,2-bis[4-(4-aminophenoxy)phenyl]propane, bis[(3-aminophenoxy)phenyl]biphenyl, bis[(4-aminophenoxy)phenyl]biphenyl, 2,2-bis[4-(4-aminophenoxy)phenyl]hexafluoropropane, bis[3-(3-aminophenoxy)phenyl]ether, bis[3-(4-aminophenoxy)phenyl]ether, bis[4-(3-aminophenoxy)phenyl]ether, and bis[4-(4-aminophenoxy)phenyl]ether. A single one of these diamine compounds may be used or two or more may be used.

There are no particular limitations on the component c) aldehyde compounds preferably used in the present invention, but formaldehyde is preferred. Formaldehyde can be used, for example, in the form of its polymer (paraformaldehyde) or can be used as its aqueous solution (formalin). The reaction proceeds smoothly when paraformaldehyde is used. Examples of other aldehyde compounds that can also be used may include acetaldehyde, propionaldehyde, butyraldehyde and the like.

The process for producing the thermosetting resins that are preferably used for the precursor resin composition can be exemplified by heating and reacting the aforementioned components a), b), and c) in a suitable solvent.

While there are no particular limitations on the solvent used to produce the thermosetting resins, a solvent that provides a good solubility for the phenol compound and diamine compound (starting materials) and the polymer (product) enables a high degree of polymerization to be obtained. Examples of such solvents may include aromatic solvents such as toluene, xylene, and so forth; halogenated solvents such as chloroform, dichloromethane, and so forth; and ether solvents such as THF, dioxane, and so forth.

There are also no particular limitations on either the reaction temperature or the reaction time used to produce the thermosetting resins; however, the reaction may be generally carried out for from several tens of minutes to several hours at a temperature from room temperature to approximately 120° C. A reaction for 20 minutes to 9 hours at from 30° C. to 110° C. is particularly preferred in the present invention because under these conditions the reaction proceeds to give a polymer that can serve as preferred thermosetting resins for the precursor resin composition.

In addition, removal of the water produced by the reaction from the system is also effective for causing the reaction to go forward.

After the reaction, the polymer can be precipitated by the addition of a large amount of a poor solvent, e.g., methanol, to the solution and can then be separated and dried to obtain the aforementioned thermosetting resin (target polymer).

Monofunctional amine compounds, trifunctional amine compounds, and other diamine compounds can also be used within a range that does not impair the properties of the preferred thermosetting resin for the aforementioned resin composition.

The degree of polymerization can be adjusted using monofunctional amines, while branched polymers can be obtained through the use of the trifunctional amine. The properties can be adjusted through the co-use of other diamine. These can be used at the same time as the diamine compound required by the present invention, or they can be reacted through their addition to the reaction system after due consideration of the reaction sequence.

The preferred thermosetting resins for the aforementioned resin composition have the following general formula:

(X in the formula represents an organic group that contains at least 3 carbons or represents an aromatic ring-containing organic group that contains at least 6 carbons, and may contain N, O, and/or F as heteroatoms, provided that the benzene rings on the two sides of X are bonded to different atoms in X.

Y in the formula represents an organic group that contains at least 5 carbons, and may contain N, O, and/or F as heteroatoms, and provided that the benzene rings on the two sides of Y are bonded to the same atom in Y or to a different atom in Y.)

Such a thermosetting resin is a resin that offers diverse advantages: it has a particularly good heat resistance and good electrical properties; it additionally has a good water resistance, good chemical resistance, good mechanical strength, good reliability, and so forth; it also poses no problems with regard to cost or volatile by-products during cure; it has an excellent storage stability; and it offers a wide range of freedom with regard to molecular design. In addition, it can be easily processed into, for example, film and sheet.

The thermosetting composition that contains at least the aforementioned thermosetting resin can be used for the resin composition that constitutes the pre-bake precursor for the baked resin product according to the present invention. Such a thermosetting composition preferably contains the aforementioned thermosetting resin as its main component; for example, it contains the aforementioned thermosetting resin as its main component and other thermosetting resin as a secondary component.

Examples of the other thermosetting resin functioning as a secondary component may include epoxy resins, thermosetting modified polyphenylene ether resins, thermosetting polyimide resins, silicon resins, melamine resins, urea resins, allyl resins, phenolic resins, unsaturated polyester resins, bismaleimide resins, alkyd resins, furan resins, polyurethane resins, aniline resins, and so forth. Among these, epoxy resins, phenolic resins, and thermosetting polyimide resins are more preferred because they can bring about additional improvements in the heat resistance of moldings produced from the composition. A single one of these other thermosetting resins may be used or two or more may be used in combination.

A compound that contains at least one dihydrobenzoxazine ring in the molecule and that preferably contains at least two dihydrobenzoxazine rings in the molecule is preferably used as a secondary component in such thermosetting compositions. This is effective for maximizing the appearance of the excellent characteristics displayed by benzoxazine resins. Such a compound can be obtained by a condensation reaction among formaldehyde, a compound having a primary amino group in the molecule, and a compound whose molecule contains phenolic hydroxyl and H at one of the positions ortho thereto. Here, a compound having only one primary amino group in the molecule is used when a compound having a plurality of phenolic hydroxyls in the molecule is used, while a compound having only one phenolic hydroxyl in the molecule is used when a compound having a plurality of primary amino groups in the molecule is used. Only one compound that contains at least one dihydrobenzoxazine ring in the molecule may be used, or two or more may be used in combination.

The thermosetting composition may, as necessary, contain any of various additives, for example, flame retardants, nucleating agents, antioxidants (ageing inhibitors), heat stabilizers, light stabilizers, ultraviolet absorbers, lubricants, flame retardant auxiliary, antistatic agents, antifogging agents, fillers, softeners, plasticizers, colorants, and so forth. A single such additive may be used or two or more may be used in combination. A reactive or nonreactive solvent can also be used in the preparation of this thermosetting composition. The thermosetting composition that has been formulated as a solution using such a solvent can also be used as a varnish. From 5 weight % to 95 weight % may be used for the resin solids.

In order to provide flexibility, such a thermosetting composition may, as necessary, be made into a composite by impregnation of the not-yet-cured thermosetting composition into a heat-resistant nonwoven fabric, woven fabric, or porous film. Examples of the material of this heat-resistant nonwoven fabric, woven fabric, or porous film may include glass, PTFE, LCP (liquid-crystal plastic), polyethylene, polypropylene, carbon fiber, and so forth.

The baked resin product according to the present invention can be used in the form, inter alia, of the cured article obtained by curing the aforementioned thermosetting resin or thermosetting composition by baking the aforementioned resin composition, or the molding obtained without curing or as necessary by partially curing the aforementioned thermosetting resin or thermosetting composition, or the cured molding obtained by curing such a molding.

The molding used here is a molding obtained as necessary by partially curing the aforementioned thermosetting resin or thermosetting composition containing the thermosetting resin, or is a molding obtained without curing the aforementioned thermosetting resin or thermosetting composition containing the thermosetting resin. Since the thermosetting resin has the capacity to be molded even prior to curing, the molding may be a molding obtaining by curing by the application of heat after pre-curing molding has been carried out (cured molding), or may be a molding obtained by curing at the same time as molding (cured article). There are no particular limitations on the dimensions and shape of the molding, and examples here are sheets (plates), blocks, and so forth; provision at another position is also possible (for example, a tacky layer).

A suitable cure accelerator may be added in order to carry out curing. This cure accelerator can be any cure accelerator ordinarily used in the ring-opening polymerization of dihydrobenzoxazine compounds, for example, multifunctional phenols such as catechol, bisphenol A, and so forth; sulfonic acids such as p-toluenesulfonic acid, p-phenolsulfonic acid, and so forth; carboxylic acids such as benzoic acid, salicylic acid, oxalic acid, adipic acid, and so forth; metal complexes such as cobalt (II) acetylacetonate, aluminum (III) acetylacetonate, zirconium (IV) acetylacetonate, and so forth; metal oxides such as calcium oxide, cobalt oxide, magnesium oxide, iron oxide, and so forth; calcium hydroxide; imidazole and derivatives thereof; tertiary amines and salts thereof, such as diazabicycloundecene, diazabicyclononene, and so forth; and phosphorus compounds and derivatives thereof, such as triphenylphosphine, triphenylphosphine•benzoquinone derivative, triphenylphosphine•triphenylboron salt, tetraphenylphosphonium•tetraphenylborate, and so forth. A single one of the preceding may be used or mixtures of two or more may be used.

Even when the reaction temperature has been lowered through the use of a cure accelerator, the specified heat resistance can be expected to appear when the peak at 58±2 ppm appears in the $^{13}$C-NMR measurement executed on the baked resin product.

While there is no particular limitation on the quantity of cure accelerator addition, the addition of overly large quantities can cause a deterioration in the dielectric properties by raising the dielectric constant or dielectric loss tangent and can have a negative influence on the mechanical properties, and the cure accelerator is therefore generally used in a proportion of preferably no more than 5 weight parts and more preferably no more than 3 weight parts, in each case based on 100 weight parts of the thermosetting resin.

The baked resin product according to the present invention—which as described above is preferably obtained by baking a precursor resin composition comprising the aforementioned thermosetting composition or the aforementioned thermosetting resin in the prescribed temperature range—is able to exhibit an excellent heat resistance and excellent dielectric properties because it is obtained by baking the precursor resin composition having an aromatic benzoxazine structure at the specified temperature.

Moreover, based in accordance with the preferred aspect on the manifestation of the thermosettability exhibited by the aforementioned thermosetting resin or the aforementioned thermosetting composition, the baked resin product according to the present invention exhibits an excellent reliability, flame retardancy, moldability, aesthetics, and so forth and also has a high glass-transition temperature (Tg), and can therefore also be used at a location exposed to stress or in a movable part. In addition, because volatile by-products are not produced during polymerization, volatile by-products do Ltd.), 25.13 g (0.06 mol) of 2,2-bis[4-(4-aminophenoxy)phenyl]propane (98%, from Tokyo Chemical Industry Co., Ltd.), and 8.05 g (0.25 mol) of paraformaldehyde (94%, from Wako Pure Chemical Industries, Ltd.) were introduced into chloroform and a reaction was carried out for 6 hours under reflux while removing the produced water. The reaction scheme is shown below. A large amount of methanol was introduced into the solution after the reaction in order to precipitate the product. This was followed by separation of the product by filtration and washing with methanol. Drying the washed product under a reduced pressure gave a thermosetting resin whose main component was the benzoxazine compound with the structure shown below.

The obtained resin had a weight-average molecular weight of 19,500 according to molecular weight measurement by GPC.

not then remain in the molding, which is also preferable from the standpoint of hygiene management.

The baked resin product according to the present invention is well adapted for use as an electronic component, electronic device and as a material therein, and for multilayer substrates, laminates, sealants, adhesives, and so forth where particularly good dielectric properties are required.

Examples of the electronic devices may include portable phones, display devices, vehicle-mounted devices, computers, communication devices, and so forth.

Other applications include aeronautical, automotive, construction materials, and so forth.

Additional applications include utilization as an electroconductive material and particularly as a heat-resistant binder for metal fillers and for the formation of circuits that can carry direct or alternating current.

Representative examples of the present invention are given below, but the present invention is in no way limited by these.

Production Example 1

Production of BisP-BAPP 21.21 g (0.06 mol) of α,α'-bis(4-hydroxyphenyl)-1,4-diisopropylbenzene (98%, from Tokyo Chemical Industry Co., Production Example 2

Production of BisA-BAPP

A thermosetting resin was synthesized as in Production Example 1, but in this case using 13.7 g (0.06 mol) of 2,2'-bis(4-hydroxyphenyl)propane in place of the α,α'-bis(4-hydroxyphenyl)-1,4-diisopropylbenzene used in Production Example 1. The obtained resin had a weight-average molecular weight of 8,900 according to molecular weight measurement by GPC.

Examples 1 to 5 and Comparative Examples 1 to 6

Procedure for Producing the Baked Resin Product

The produced BisA-BAPP or BisP-BAPP was dissolved in toluene (solvent) to prepare the 50 weight % solution and a precursor film (=pre-baking resin composition) was prepared by casting by the usual method with drying for 30 minutes at 100° C. The resulting precursor film was baked in an oven for the time and at the temperature reported below to manufacture a film that was the target baked resin product.

NMR Measurement Procedure

The target film was submitted to $^{13}$C CP/MAS NMR. The instrument was an ECX400 (400 MHz) from JEOL, and the probe was an SH40T4. The measurement procedure was as follows: The film (thickness=75 to 100 μm) was ground using a freezing grinder and 64 μL was packed into a 4 mmφ silicon nitride test tube. The CP technique was used for the measurement procedure. The following parameters were used: carbon resonance frequency=100.5253 MHz, observation frequency center=100 ppm, number of observation points: 1024, spectral width=60.02401 (kHz), number of scans=6000. The MAS angle and spectral width were suitably adjusted prior to measurement. The shims (Z1, X, Y, $X^2$, $Y^2$) were adjusted by a generally used method (so as to bring the half width of the adamantane reference substance to 5 Hz or less). The settings in the CP technique were decoupling by TPPM, contact time=2 ms, RAMPshape. A Gaussian function (20 [Hz]) was applied to the obtained FID; zero filling was carried out; and Fourier transformation then yielded the $^{13}$C CP/MAS NMR spectrum. Then, after peak separation by curve fitting, "O" was assigned when the peak at 58±2 ppm was present and an "x" was assigned in its absence.

The obtained film was manufactured in a thickness of 80 μm and a width of 4 mm and the elongation-versus-temperature was measured with a DMS6100 (TMA from Seiko Instruments Inc.) in order to evaluate the CTE (=α). α was measured at from 23° C. to the baking temperature.

The obtained film was also finely diced and the 5% weight loss temperature (Td5) was evaluated in an air at a rate of temperature rise of 10° C./min by TGA using a DTG-60 (model name, from Shimadzu).

| resin used | baking temp. | baking time | α | Td5 | presence of peak | half width |
|---|---|---|---|---|---|---|
| Ex. 1: BisA-BAPP | 300° C. | 1 hr | 77 | 412 | ○ | 5.5 |
| Ex. 2: BisA-BAPP | 280° C. | 1 hr | 76 | 413 | ○ | 5.3 |
| Ex. 5: BisA-BAPP | 240° C. | 16 hr | 79 | 412 | ○ | 5.7 |
| Comp. Ex. 1: BisA-BAPP | 260° C. | 1 hr | 120 | 399 | X | — |
| Comp. Ex. 2: BisA-BAPP | 240° C. | 1 hr | 118 | 395 | X | — |
| Comp. Ex. 3: BisA-BAPP | 180° C. | 1 hr | 120 | 396 | X | — |
| Ex. 3: BisP-BAPP | 300° C. | 1 hr | 56 | 406 | ○ | 6.1 |
| Ex. 4: BisP-BAPP | 280° C. | 1 hr | 57 | 407 | ○ | 5.8 |
| Comp. Ex. 4: BisP-BAPP | 260° C. | 1 hr | 71 | 392 | X | — |
| Comp. Ex. 5: BisP-BAPP | 240° C. | 1 hr | 73 | 392 | X | — |
| Comp. Ex. 6: BisP-BAPP | 180° C. | 1 hr | 72 | 392 | X | — |

35-μ copper plating for interconnect service was then produced by the standard method on the film.

The resulting film was immersed for 120 seconds in a 260° C. solder bath and blistering and peeling of the copper foil was thereafter visually evaluated.

As a result, the films of Comparative Examples 1 to 6 exhibited blistering (=result x) due to the production of volatile components in the solder bath; the cause was the low 5% weight loss temperature. In contrast to this, the films of Examples 1 to 4 did not exhibit blistering (=result O) in the solder bath due to their high 5% weight loss temperatures.

Considering the residual stress, the CTE is desirably low enough to be near the CTE of copper foil.

Industrial Applicability

The present invention is industrially useful as a baked resin product that exhibits an excellent heat resistance, as a process of producing this baked resin product, and as an electronic device that incorporates this baked resin product.

The invention claimed is:

1. A baked resin product obtained by baking a resin composition comprising a main chain-type aromatic benzoxazine structure, wherein the baking temperature for baking the resin composition is from 270 to 350° C., the baking time is one hour, and the baked resin product has a peak measured by $^{13}$C-NMR at 58±2 ppm and a half width of this peak of 4 to 10 ppm.

2. The baked resin product according to claim 1, wherein a coefficient of linear thermal expansion CTE determined by TMA is from 30 to 80 ppm/° C.

3. The baked resin product according to claim 1, wherein a 5% weight loss temperature is at least 400° C.

4. The baked resin product according to claim 1, wherein the main chain-type aromatic benzoxazine structure is formed of a thermosetting resin that is obtained by heating and reacting a) a multifunctional phenol compound represented by general formula (I) given below, b) a diamine compound represented by general formula (II) given below, and c) an aldehyde compound (I)

(wherein X represents an organic group that contains at least 3 carbons or an aromatic ring-containing organic group that contains at least 6 carbons, and may contain N, O, or F as heteroatoms, provided that the benzene rings on the two sides of X are bonded to the same atom in X or to different atoms in X)

(II)

(wherein Y represents an organic group that contains at least 5 carbons and may contain N, O, or F as heteroatoms, wherein the benzene rings on the two sides of Y are bonded to different atoms in Y).

5. The baked resin product according to claim 4, wherein X is bonded mainly to para position with respect to a OH group on the benzene ring on both sides of X, and X has either or both of the structures given below or represents —C(CH$_3$)$_2$—:

6. The baked resin product according to claim 4, wherein X has the structure given below:

(wherein n is an integer from 0 to 10).

7. The baked resin product according to claim 4, wherein X has the structure given below:

(wherein n is an integer from 0 to 10).

8. The baked resin product according to claim 4, wherein Y in the general formula (II) contains at least one benzene ring.

9. The baked resin product according to claim 5, wherein Y in the general formula (II) is at least one group selected from the group of formulas given below and is bonded to meta position or para position with respect to the $NH_2$ group on the benzene ring on both sides of Y:

10. The baked resin product according to claim 6, wherein Y in the general formula (II) is at least one group selected from the group of formulas given below and is bonded to meta position or para position with respect to the $NH_2$ group on the benzene ring on both sides of Y:

11. The baked resin product according to claim 7, wherein Y in the general formula (II) is at least one group selected from the group of formulas given below and is bonded to meta position or para position with respect to the $NH_2$ group on the benzene ring on both sides of Y:

12. The baked resin product according to claim 8, wherein Y in the general formula (II) is at least one group selected from the group of formulas given below and is bonded to meta position or para position with respect to the $NH_2$ group on the benzene ring on both sides of Y:

13. The baked resin product according to claim 11, wherein Y in the general formula (II) contains at least two benzene rings.

14. The baked resin product according to claim 5, wherein Y in the general formula (II) is at least one group selected from the group of formulas given below and is bonded to meta position or para position with respect to the $NH_2$ group on the benzene ring on both sides of Y:

-continued

15. The baked resin product according to claim 10, wherein Y in the general formula (II) is at least one group selected from the group of formulas given below and is bonded to meta position or para position with respect to the NH$_2$ group on the benzene ring on both sides of Y:

16. The baked resin product according to claim 11, wherein Y in the general formula (II) is at least one group selected from the group of formulas given below and is bonded to meta position or para position with respect to the NH$_2$ group on the benzene ring on both sides of Y:

17. The baked resin product according to claim 12, wherein Y in the general formula (II) is at least one group selected from the group of formulas given below and is bonded to meta position or para position with respect to the NH$_2$ group on the benzene ring on both sides of Y:

18. The baked resin product according to claim 1, wherein the main chain-type aromatic benzoxazine structure is formed of a thermosetting composition that contains at least the thermosetting resin.

19. The baked resin product according to claim 1, comprising a cured article obtained by curing the thermosetting resin or a thermosetting composition that contains at least the thermosetting resin, or comprising a molding obtained without curing or as necessary by partially curing the thermosetting resin, or comprising a cured molding obtained by curing such a molding.

20. The baked resin product according to claim 1, wherein the baked resin product is a film.

21. The baked resin product according to claim 18, wherein the thermosetting composition contains a compound that has at least one dihydrobenzoxazine structure within a molecule.

22. The baked resin product according to claim 18, wherein the baked resin product is a film.

23. The baked resin product according to claim 19, wherein the baked resin product is a film.

24. The baked resin product according to claim 21, wherein the baked resin product is a film.

25. A method of producing the baked resin product as claimed in claim 1 comprising a main chain-type aromatic benzoxazine structure, and the baked resin product has a peak measured by $^{13}$C-NMR at 58±2 ppm and a half width of this peak of 4 to 10 ppm, comprising: baking a resin composition that contains a main chain-type aromatic benzoxazine structure at a temperature of 270° C. to 350° C.

26. An electronic device that incorporates the baked resin product according to claim 1.

\* \* \* \* \*